(12) United States Patent
Gupta et al.

(10) Patent No.: US 7,930,515 B2
(45) Date of Patent: Apr. 19, 2011

(54) VIRTUAL MEMORY MANAGEMENT

(75) Inventors: Nitin P Gupta, Bangalore (IN);
Madhavan Srinivasan, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/181,528

(22) Filed: Jul. 29, 2008

(65) Prior Publication Data
US 2010/0030997 A1 Feb. 4, 2010

(51) Int. Cl.
*G06F 12/00* (2006.01)
(52) U.S. Cl. .................. 711/206; 711/216; 711/221
(58) Field of Classification Search .............. 711/206, 711/216, 221
See application file for complete search history.

(56) References Cited

U.S. PATENT DOCUMENTS

| | | | |
|---|---|---|---|
| 5,446,854 A | 8/1995 | Khalidi et al. | |
| 5,479,627 A | 12/1995 | Khalidi et al. | |
| 5,784,707 A | 7/1998 | Khalidi et al. | |
| 7,159,095 B2 | 1/2007 | Dale et al. | |
| 7,284,112 B2 | 10/2007 | Bradford et al. | |
| 7,383,415 B2 * | 6/2008 | Jordan et al. | 711/207 |
| 7,418,572 B2 * | 8/2008 | Hepkin | 711/204 |
| 7,454,590 B2 * | 11/2008 | Jordan et al. | 711/207 |

OTHER PUBLICATIONS

Lee, Jung-Hoon, et al., "A dynamic TLB management structure to support different page sizes", Proceedings of Second IEEE Asia Pacific Conference on ASICs. AP-ASIC 2000, dated: Aug. 28-30, 2000, pp. 299-302, IEEE, Piscataway, NJ, USA.

Senzec, A., "Concurrent support of multiple page sizes on a skewed associative TLB", IEEE Transactions on Computers. vol. 53, Issue 7, dated Jul. 2004, pp. 924-927, IEEE, USA.

* cited by examiner

*Primary Examiner* — Stephen C Elmore
(74) *Attorney, Agent, or Firm* — Garg Law Firm, PLLC; Rakesh Garg; Libby Z. Toub (57) ABSTRACT

A method for managing a virtual memory system configured to allow multiple page sizes is described. Each page size has at least one table associated with it. The method involves maintaining entries in the tables to keep track of the page size for which the effective address is mapped. When a new effective address to physical address mapping needs to be made for a page size, the method accesses the appropriate tables to identify prior mappings for another page size in the same segment. If no such conflicting mapping exists, it creates a new mapping in the appropriate table. A formula is used to generate an index to access a mapping in a table.

16 Claims, 5 Drawing Sheets

MEMORY ARCHITECTURE

HASH TABLE

FIG. 5

VIRTUAL MEMORY MANAGEMENT

TECHNICAL FIELD

This invention deals with the field of memory management in computer systems and more particularly with effective address management in an environment supporting multiple page sizes.

BACKGROUND OF THE INVENTION

Contemporary computer systems require large memories, and consequently, memory management is essential to increasing system performance. Memory in computers can be broadly classified as main memory and virtual memory. Main memory is the physical memory, the memory chips or disk drives or other storage media. Locations in main memory have addresses that correspond to actual locations on the memory device, and the system processor can directly and rapidly access those locations. The virtual memory address space is a programming construct, designed to facilitate memory management by program developers by abstracting logical memory addresses from physical locations. The virtual memory space can be considerably larger than the available RAM, and it is allocated to programs in contiguous blocks. As a program runs, the virtual memory system moves data among fixed storage locations (generally on hard disk, flash memory or the like), RAM, caches, and temporary storage locations on a fixed storage device, swapping data from location to location as needed. Logical memory addresses must be mapped to the physical memory locations where the data actually reside, and the virtual memory system accomplishes this task in a manner transparent to the programmer.

Virtual memory is divided into pages of a size chosen based on the capabilities of the system environment. During program operation, data is moved between wherever it resides in fixed storage (on a hard disk or CD-ROM, for example) into RAM, and that movement is done in page-sized blocks. The data may not reside in a contiguous block in fixed storage, and it may not be loaded into a contiguous block in RAM, but the application program only deals with virtual memory addresses, leaving mappings to wherever the data is physically located to the system. Addresses are "translated" by the system from virtual to main memory.

Because data is moved in page sized blocks, the page size itself directly affects system efficiency. If the page size is small, but data requirements are large, for example larger than the page size, the number of data read and data write operations will be multiplied. Conversely, if the page size is considerably larger than typical data requirements, then more memory will be allocated to each operation than is required. Both situations produce inefficiency, and the art has responded by employing multiple page sizes, so that an application may be able to use 4K, 64K and 16M pages, for example, depending on the needs of a particular application.

Multiple page sizing has been implemented in many systems by introducing segmentation, which allows division of the memory address space into larger blocks of varying size, segments, which contain pages of equal size. This technique provides improved flexibility, particularly while multitasking, but it also creates some new issues. In particular, segmentation introduced another level of memory address abstraction, requiring further address translation. Thus, multiple page sizing increases the task of allocating and employing the physical memory, and errors in that process can lead to memory collisions, in which several running applications could lose data. The Operating System must avert such situations by avoiding conflicting address translations with any other page size in the segment. Consequently, a computer system with a virtual memory, which supports multiple page sizes in a segment, is required to manage addresses during address translations efficiently.

BRIEF SUMMARY OF THE INVENTION

According to one embodiment of the invention, a method for managing a virtual memory system configured to allow multiple page sizes is disclosed. The method provides two sets of tables, a first set having one member for each configured page size and a second set having one member for each configured page size except the smallest configured page size. Each member of the first set includes translation descriptors, each translation descriptor includes effective address to physical address mappings made during address translations for pages of the corresponding size, and each member of the second set includes translation descriptors having effective address to physical address mappings, made during address translations for pages of all sizes except the corresponding page size.

Further, the method involves receiving an effective address and an appropriate page size, based on which a first mapping is calculated. If the Received Page Size (RPS) is the smallest configured page size, the method checks for an existing mapping in the table for pages of the corresponding size, in the first set. If an existing mapping is not found, the next step is to check all other tables in the first set for an existing mapping for a page size other than the RPS. A mismatch situation results if such a mapping is found. If the RPS is not the smallest configured page size, the method checks for an existing mapping in the table for pages of the corresponding size in the first set. If an existing mapping is not found, the next step is to check all tables in the second set for an existing mapping for a page size other than the RPS. Again, a mismatch situation results if such a mapping is found. In either case, if a conflicting mapping is not found, a mapping is created in the table for pages of the RPS in the first set. Further mappings are made in all the tables of the second set, except the one corresponding to the RPS.

In a further embodiment, a virtual memory management system comprises two sets of tables, two searching modules, a decision module and a writing module. The decision module is configured to receive an effective address and a page size, and to identify whether the RPS is smallest. Based on the RPS, the searching modules conduct searches in appropriate tables to find out whether the effective address to physical address mapping already exists for the RPS or for other page sizes. If no prior effective address to physical address mapping is discovered, the writing module creates a new mapping in each appropriate table.

DETAILED DESCRIPTION OF THE INVENTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

The embodiments discussed and illustrated here essentially describe a computer system supporting multiple page sizes in a memory segment, as well as a method to manage virtual memory in such a system.

Figure 1:
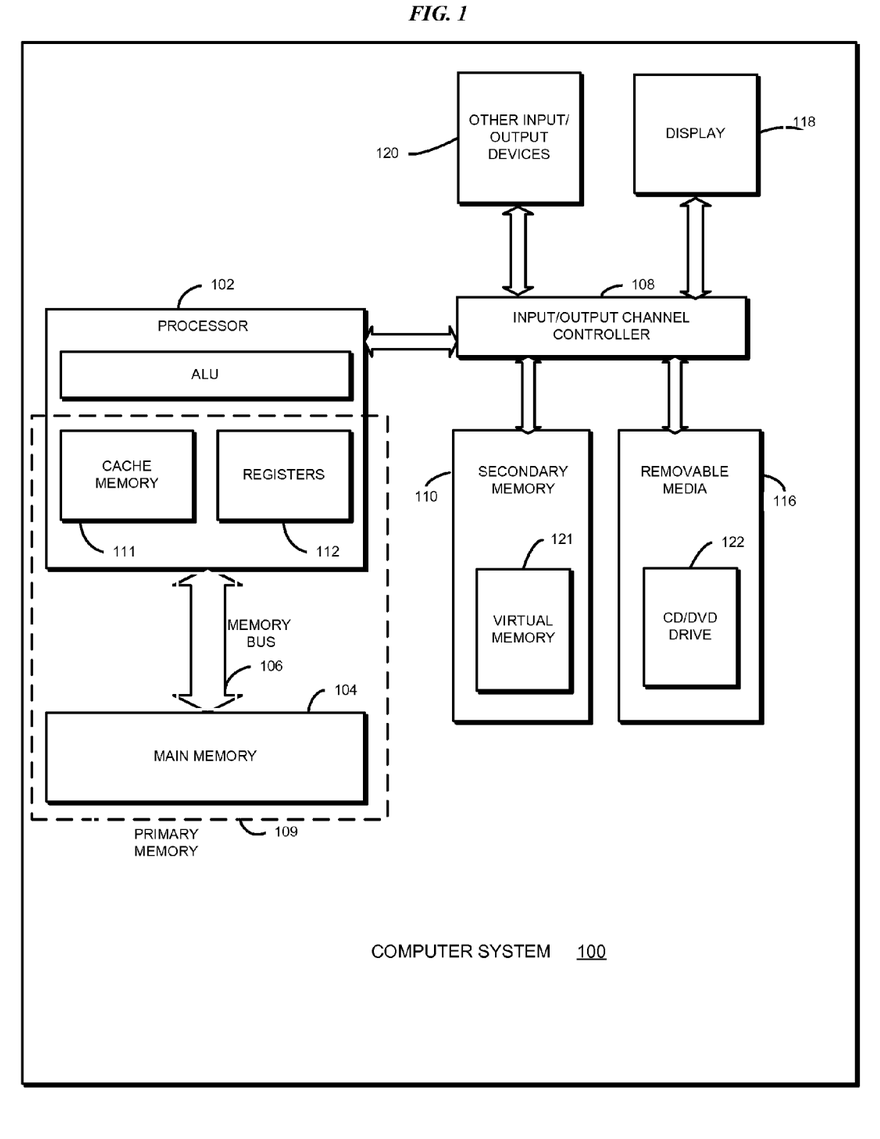
FIG. 1 illustrates a conventional computer system, suitable for operation of the claimed invention.

Referring now to the drawings, FIG. 1 describes a conventional computer system 100, which provides the operating environment for embodiments of the claimed invention. The system includes a processor 102 connected to a main memory 104, via a memory bus 106, and an Input/Output (I/O) channel controller 108, which connects the processor 102 to other elements of the computer system 100. The computer system 100 possesses a partitioned memory space, which may include a primary memory 109 and a secondary memory 110. The primary memory 109 may include a cache memory 111, registers 112 and the main memory 104, and is the first level of memory accessed by a computer program during its execution. The primary memory 109 exploits the principles of temporal and spatial locality to import the necessary code and data for the computer program, from the secondary memory 110. That is, the system design includes the principles that a memory location accessed at one point in time is likely to be accessed again in the near future (temporal locality) and that accessing one memory location increases the likelihood that nearby locations will be accessed in the near future (spatial locality). If the computer program fails to find the required data or code in the primary memory 109, it proceeds to making a much longer access to the secondary memory 110. The processor 102 communicates with the secondary memory 110, a removable media 116, a display unit 118 and other I/O devices 120 through the I/O channel controller 108. The secondary memory 110 includes a virtual memory 121, which may be maintained on disk. Further, the removable media 116 may include a CD/DVD drive 122 designed to read and write information from/to removable disks.

The virtual memory is relatively large, e.g. 64 bits in width, and is divided into pages. During execution, computer programs access the computer memory space using a virtual address, which is further described in relation to FIG. 2. The computer converts the virtual address to a physical address in order to access the main memory, a process referred to as address translation. During program execution, pages from the computer program's address space are swapped between the main memory and the virtual memory. As a result, a large virtual memory space is available to the processor, though it needs to address only the much smaller and faster main memory. Additionally, using the main memory in this fashion results in a much shorter access time.

Modern computer systems utilize a technique called segmentation, dividing virtual memory into segments, each of which is mapped to blocks of pages. Segmentation introduces another level of organization into the memory architecture. As a result, the system requires an effective address as another level of addressing to access memory.

Figure 2:
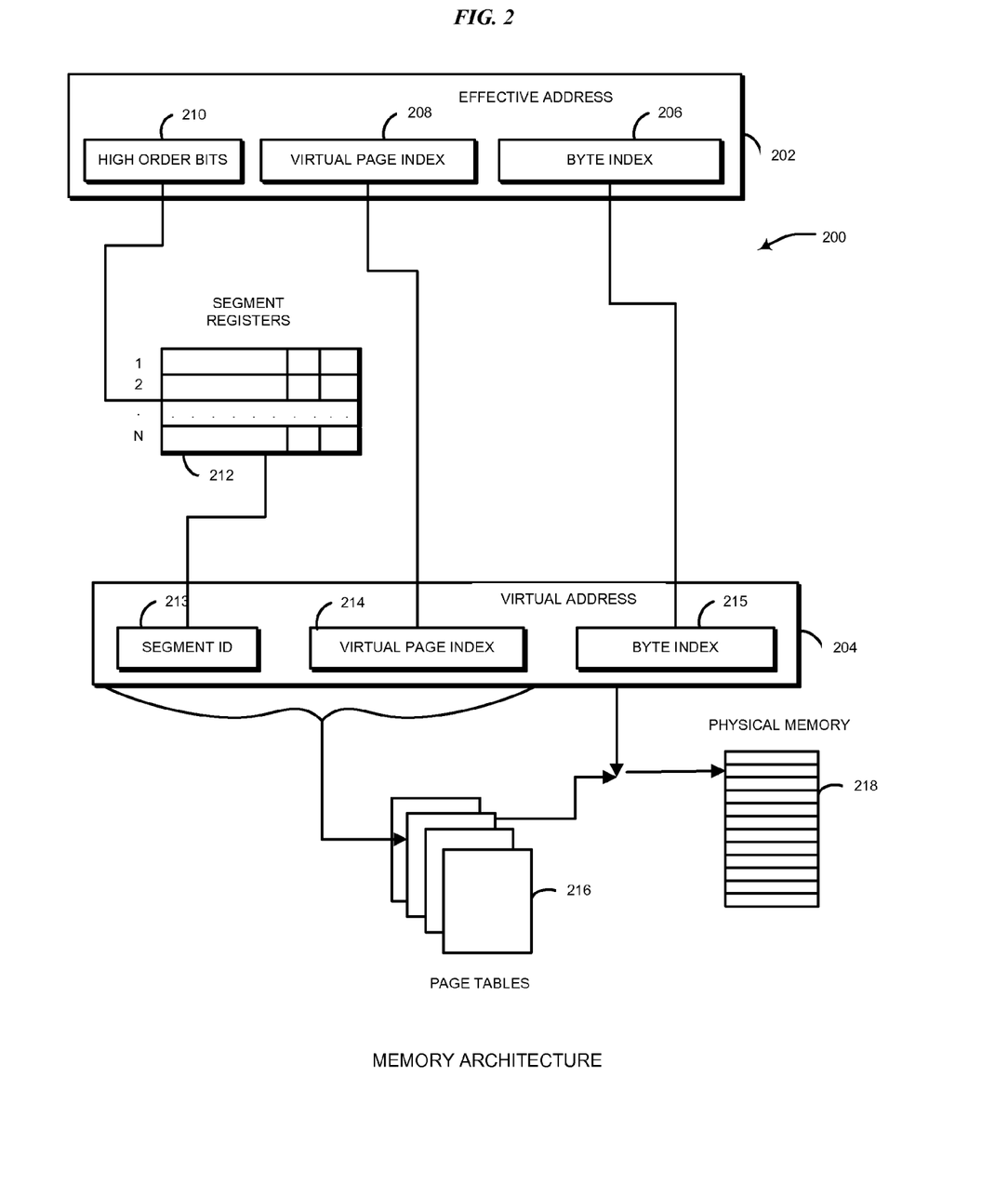
FIG. 2 illustrates a memory architecture using segmentation and paging.

A memory architecture 200 using segmentation as well as paging, is shown in FIG. 2. As seen there, a computer program uses an effective address 202, mapped to a virtual address 204. The computer system 100 makes two levels of translations: one from effective address to virtual address and another from virtual address to physical address. The effective address 202 includes a byte index 206 and a virtual page index 208. Few high order bits 210 of the effective address are used to point to a segment register 212, and the segment register 212 in turn provides a segment ID 213. In an embodiment, four high order bits are used to select one of sixteen segment registers, but those in the art will understand that other structures can be used to perform this task. The segment ID 213, concatenated with the virtual page index 214 and the byte index 215 (both of these are obtained from the effective address 202), yields the virtual address 204. The segment ID 213 identifies a segment in the virtual memory 121, while the virtual page index 214 further identifies a page within the segment. A page table 216 provides a mapping from the virtual page index 214 to a physical page index. A concatenation of the physical page index with the byte index 215 forms a physical address and uniquely pinpoints a page in a physical memory 218, while the byte index 215 uniquely identifies a byte within the page.

It should be noted that alternate memory architectures are known in the art. Some of these may include only one level of translation from a virtual address to a physical address. In such architectures, the terms virtual address and effective address are used interchangeably.

Virtual memory pages can be configured in a single page size, or the system can be configured to work with multiple page sizes. A page in virtual memory can have a size of 4K bits, for example, providing 4096 addressable locations. When multiple processes are running simultaneously on a computer, the main memory 104 (FIG. 1) imports pages from each of their address spaces for the use of the processor 102. Paging techniques exploit temporal locality, the idea that the same memory locations are likely to be reused during a short time frame, and spatial locality which presumes the likelihood of using memory locations which are in close proximity to a recently used memory location is high. If the processes are small and few in number, small amounts of data or code need to be accessed and thus small sized pages, such as 4K pages suffice. Increasing complexity of processes results in bigger data structures and larger number of programs running simultaneously. As the number of pages that needs to be accessed goes up, the continued use of small sized pages would impose a large overhead due to the continuous swapping of pages between the main memory 104 and the virtual memory 121. Larger page sizes become crucial to efficient handling of memory.

Contemporary computer designs support multiple page sizes, providing an adaptive selection of page size depending on the processing load. Although segmentation provides increased flexibility during processing, it may result in collisions. Collisions occur when a memory location is imported into the main memory 104 twice, during accesses involving different page sizes. In computer designs supporting multiple page sizes, the Operating System (OS) needs to ensure that there are no conflicting address translations involving different page sizes in the segment.

Figure 3:
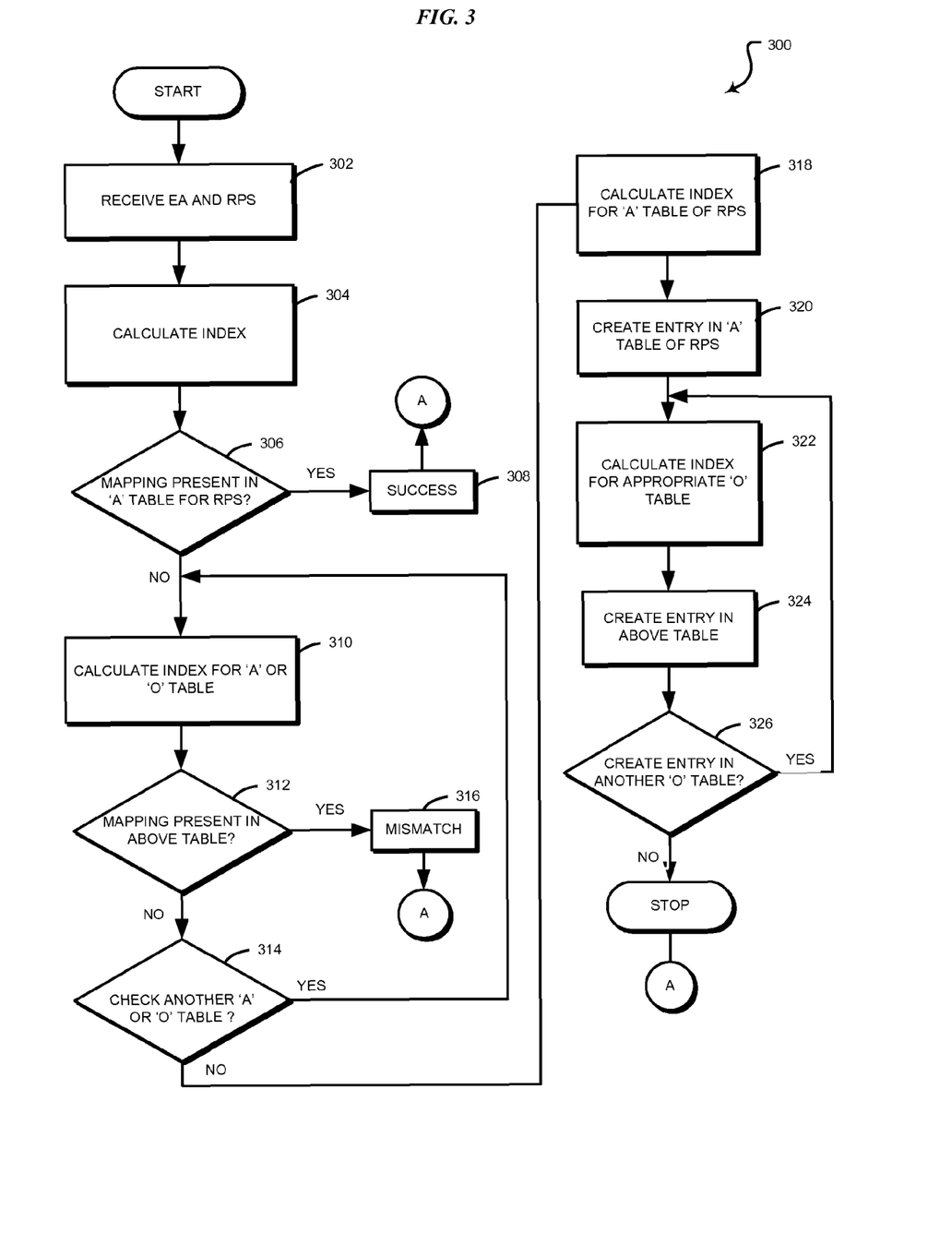
FIG. 3 illustrates an embodiment of a method for managing a virtual memory system that supports multiple page sizes in a segment, as set out in the claimed invention.

An embodiment 300 of a method used to manage a virtual memory supporting multiple page sizes in a segment is shown in FIG. 3. The method provides two sets of tables. In the described embodiment, the table entries include translation descriptors, which in turn include effective addresses to physical address mappings and may include additional translation details, such as protection bits, etc. The availability of these direct mappings eliminates the need to perform the address translations explained in the memory architecture 200, and thus reduces the load on the processor 102.

Further, the embodiment shown here employs two types of tables. A first type, denoted "A" type, includes a set of tables, with members corresponding to each page size. Each "A" type table includes entries made during address translation mappings to pages of its corresponding size, that is, if 4K, 64K and 16M are three configured page sizes, A4K, A64K and A16M will be tables corresponding to 4K, 64K and 16M size pages, respectively.

A second table type is denoted "O" type, likewise indicating a set of tables, including one member corresponding to each page size, except the smallest page size. Each "O" type table includes entries made during address translation mappings to pages of all sizes except its corresponding size. That is, if 4K, 64K and 16M are three configured page sizes, then 64K size pages will have an O64K table including entries made during address translation mappings to 4K and 16M size pages, 16M size pages will have an O16M table including entries made during address translation mappings to 4K and 64K size pages, and 4K size pages will have no "O" type table.

FIG. 3 shows the embodiment 300 of a method of the claimed invention, applying to two different scenarios, resulting from whether a Received Page Size (RPS) is the smallest configured size or not. Details of the steps followed in the two scenarios are described here. In each scenario, searching and creation of entries occurs in different tables, depending on the RPS. The type and reason for selection of the tables are also described here.

At 302, the embodiment 300 receives an effective address (EA) and a page size. At step 304, a formula is used to calculate an index. At 306, the embodiment 300 tries to match the received EA with each entry under the calculated index in the A type member table corresponding to the RPS. If an existing mapping is found for the received EA, 'success' is declared at 308 and a physical address corresponding to the RPS is returned.

If the existing mapping is not found at this point, the embodiment 300 needs to create a new mapping in the A type table corresponding to the RPS, but it first needs to ensure that this new mapping will not conflict with any existing mapping for another page size. Now, the progression of the embodiment 300 varies depending on the RPS.

If the RPS is the smallest configured page size, the embodiment 300 proceeds as follows. If no existing mapping is found at 306, steps 310, 312 and 314 conduct a search in the A type tables corresponding to all page sizes except the RPS. If the mapping of the received EA for a page size, other than the RPS, exists, step 316 reports a 'mismatch' situation, as shown. If no such mapping exists, the embodiment 300 must create a new entry in the A type table of the RPS, as follows. At 318, an index is calculated for the received EA. At 320, the embodiment 300 generates a physical address using address translation, and creates an entry for the received EA, in the A type table corresponding to the RPS. Steps 322, 324 and 326 make similar entries in all O type tables, as shown.

If the RPS is not the smallest configured page size, the embodiment 300 proceeds as follows. If no existing mapping is found at 306, steps 310, 312 and 314 conduct a search in the O type table corresponding to the RPS, as shown. If the mapping of the received EA for a page size, other than the RPS, exists, step 316 reports a 'mismatch' situation, as shown. If no such mapping exists, the embodiment 300 must create a new entry in the A type table of the RPS, as follows. At 318, an index is calculated for the received EA. At 320, the embodiment 300 generates a physical address using address translation, and creates an entry in the A type table corresponding to the RPS for the received EA. Steps 322, 324 and 326 make similar entries in all O type tables corresponding to all page sizes other than the RPS, as shown.

While the ability to handle multiple page sizes offers significant benefits, it imposes costs in terms of system overhead and management requirements. One technique for reducing management needs is the use of hash tables, as further described in connection with FIG. 4. Locating an entry in a hash table is very fast and easy, using a range of key values as inputs to a hashing function, which in turn produces an index. This technique permits recovery of the related key value from the hash table. As known in the art, indices are produced by a hashing function, such that key values are distributed randomly across the hash table using these indices.

At step 304, a hashing function may be used to calculate the index using the formula:

$$\text{index} = \text{MOD}(\text{EA} \gg \text{Page\_Size}, \text{Table\_Size}) \quad (1)$$

where the parameter Page_Size is a function of the page size corresponding to a hash table being accessed, the page size being the RPS in this case, and the parameter Table_Size is the size of the hash table being accessed. MOD is modulo function, generally known to a person skilled in the art. '$\gg$' indicates a right shift of the bits of the EA by the number indicated by the parameter Page_Size. The parameter Page_Size is calculated by taking $\log_2$ of the page size corresponding to the hash table being accessed, the page size being the RPS in this case. For example, for a 4K page size, the parameter Page_Size will be 12, for a 64K page size, the parameter Page_Size will be 16, and for a 16M page size, the parameter Page_Size will be 24. It will be clear to those of skill in the art that other hashing functions may be used to calculate the index, within the scope of the invention. Similarly, it should be understood that in any reference to formula (1), formula (1) may be replaced by any other appropriate hashing function.

In a further embodiment, if two or more effective addresses map to the same index in a hash table, the entries are maintained in the form of a linked list. The linked list may be a singly linked list, a doubly linked list or other similar structures known in the art, as described in connection with FIG. 4.

Consider a virtual memory configured to support three page sizes, namely 4K, 64K and 16M. The embodiment 300 shown in FIG. 3 follows the steps detailed in three examples, described below.

In the three examples, A4K, A64K and A16M are hash tables corresponding to 4K, 64K and 16M size pages, respectively. The A4K hash table will include entries made during address translation mappings to 4K pages, the A64K hash table will include entries made during address translation mappings to 64K pages, and the A16M hash table will include entries made during address translation mappings to 16M pages. The O type hash tables are defined as follows. 64K size pages will have an O64K hash table including entries made during address translation mappings to 4K and 16M size pages, 16M size pages will have an O16M hash table including entries made during address translation mappings to 4K and 64K size pages, and 4K size pages will have no O type hash tables.

The A4K hash table will be searched while creating a 4K mapping, to find out if any appropriate mapping already exists for the received effective address. The A64K hash table will be searched while creating 64K mappings as well as while creating 4K mappings. While creating a 64K mapping, the A64K hash table will be searched to find out if any appropriate mapping already exists for the received effective address. While creating a 4K mapping, the A64K hash table will be searched to find out if a 4K mapping conflicts with any mappings created for a 64K page. The A16M hash table will be searched while creating a 16M mapping as well as while creating a 4K mapping. While creating a 16M mapping, the A16M hash table will be searched to find out if any appropriate mapping already exists for the received effective address. While creating a 16M mapping, the A16M hash table will be searched to find out if a 4K mapping conflicts with any mappings created for a 64K page.

The O64K hash table will be searched while creating a 64K mapping, to check if there already exists a 4K mapping within the 64K range, or if there exists a conflicting 16M mapping. The O16M hash table will be searched while creating a 16M mapping, to check if there already exists a 4K mapping within the 16M range, or if there exists a conflicting 64K mapping.

In the three examples described below, the embodiment 300 refers to searching for a pre-existing effective address to physical address mapping in the A type hash table of the RPS, as searching for a 'match'. Further, the embodiment 300 refers to identification of the pre-existing effective address to physical address mapping in the A type hash table of the RPS, as a 'success'. On the other hand, a pre-existing effective address to physical address mapping to a page size, other than the RPS, is referred to as a 'mismatch'.

Example 1 describes the steps the embodiment 300 takes when the RPS is the smallest configured size, 4K in this case. The embodiment 300 conducts a search in all the A type hash tables of the configured page sizes. If a match is not found, the embodiment 300 creates a new entry in the A type hash table of the RPS and also makes corresponding entries in all O type hash tables.

EXAMPLE 1

Create a 4K Mapping for a Given Effective Address (EA)

Step 1: Calculate the hash index in the table A4K, by using the function index=MOD(EA>>12, TABLE_SIZE)

Step 2: Do a linear search over all the entries in that index, looking for a match. If a match is found, the existing mapping can be used.
Return success.
Step 3: If the search in step 2 failed, we need to create a new mapping to a physical 4K page. But before that, we need to assert that this new mapping will not conflict with any existing 64K or a 16M mapping.
 Step 3a: Calculate the hash index in the table A16M, by using the function index=MOD(EA>>24, TABLE_SIZE)

Do a linear search over all the entries in that index, looking for a match. If a match is found, a conflicting situation exists.
 Return MISMATCH.
 Step 3b: Calculate the hash index in the table A64K, by using the function index=MOD(EA>>16, TABLE_SIZE)

Do a linear search over all the entries in that index, looking for a match. If a match is found, a conflicting situation exists.
 Return MISMATCH.
Step 4: Select a physical 4K page and create an Effective to physical 4K mapping. We also need to add this effective address in the O64K and O16M tables as well as A4K hash table.
 Step 4a: Calculate the hash index in the table A4K, by using the function index=MOD(EA>>12, TABLE_SIZE)

Add this effective address in the calculated index, at the end of the linked list.
 Step 4b: Calculate the hash index in the table O64K, by using the function index=MOD(EA>>16, TABLE_SIZE)

Add this effective address in the calculated index, at the end of the linked list.
 Step 4c: Calculate the hash index in the table O16M, by using the function index=MOD(EA>>24, TABLE_SIZE)

Add this effective address in the calculated index, at the end of the linked list.

Examples 2 and 3 describe steps the embodiment 300 takes when the RPS is not the smallest configured size. The RPS is 64K in Example 2 and 16M in Example 3. The embodiment 300 conducts a search in the A type hash table of the RPS. If it doesn't find a match, it searches the O type hash table of the RPS. If it doesn't find a match in this table either, it creates a new entry in the A type hash table of the RPS. It also makes a corresponding entry in the appropriate O type hash table.

EXAMPLE 2

Create a 64K mapping for a given Effective Address (EA)

Step 1: Calculate the hash index in the table A64K, by using the function index=MOD(EA>>16, TABLE_SIZE)

Step 2: Do a linear search over all the entries in that index, looking for a match. If a match is found, the existing mapping can be used.
Return success.
Step 3: If the search in step 2 failed, we need to create a new mapping to a physical 64K page. But before that, we need to assert that this new mapping will not conflict with any existing 16M mapping OR there does not exist a 4K mapping within that 64K range.
 Step 3a: Calculate the hash index in the table O64K, by using the function index=MOD(EA>>16, TABLE_SIZE)

Do a linear search over all the entries in that index, looking for a match. If a match is found, a conflicting situation exists.
 Return MISMATCH.
Step 4: Select a physical 64K page and create an Effective to physical 64K mapping. We also need to add this effective address in the A64K hash table.
 Step 4a: Calculate the hash index in the table A64K, by using the function index=MOD(EA>>16, TABLE_SIZE)

Add this effective address in the calculated index, at the end of the linked list.
 Step 4b: Calculate the hash index in the table O16M, by using the function index=MOD(EA>>24, TABLE_SIZE)

Add this effective address in the calculated index, at the end of the linked list.

EXAMPLE 3

Create a 16M Mapping for a Given Effective Address (EA)

Step 1: Calculate the hash index in the table A16M, by using the function index=MOD(EA>>24, TABLE_SIZE)

Step 2: Do a linear search over all the entries in that index, looking for a match. If a match is found, the existing mapping can be used.
Return success.
Step 3: If the search in step 2 failed, we need to create a new mapping to a physical 16M page. But before that, we need to assert that this new mapping will not conflict with any existing 64K mapping OR there does not exist a 4K mapping within that 16M range.
  Step 3a: Calculate the hash index in the table O16M by using the function index=MOD(EA>>24, TABLE_SIZE)

Do a linear search over all the entries in that index, looking for a match. If a match is found, a conflicting situation exists.
  Return MISMATCH.
Step 4: Select a physical 16M page and create an Effective to physical 16M mapping. We also need to add this effective address in the A16M hash table.
  Step 4a: Calculate the hash index in the table A16M, by using the function index=MOD(EA>>24, TABLE_SIZE)

Add this effective address in the calculated index, at the end of the linked list.
  Step 4b: Calculate the hash index in the table O64K, by using the function index=MOD(EA>>16, TABLE_SIZE)

Add this effective address in the calculated index, at the end of the linked list.

Figure 4:
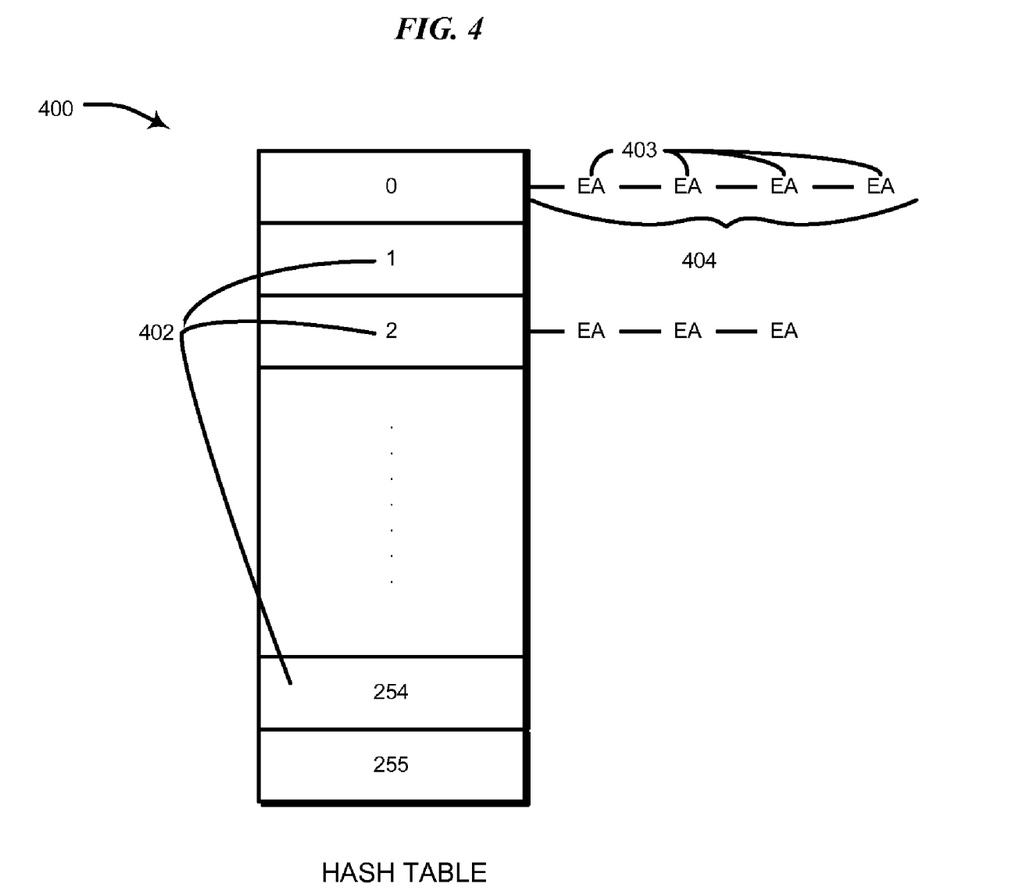
FIG. 4 illustrates an embodiment of a hash table having 256 entries, based on the embodiment of FIG. 3.

Turning now to FIG. 4, an embodiment of a hash table 400 is shown, having 256 entries. The hash table 400 uses indices 402 that map to corresponding effective addresses (EA) 403. Formula (1) is used to calculate the indices 402. If two or more of the effective addresses 403 map to the same index in the hash table 400, the entries are maintained in the form of a linked list, which is a singly linked list 404 in the embodiment described here. The linked list may be a doubly linked list or another similar structure known in the art. Each index 402 may have a linked list associated with it. The singly linked list 404 may include multiple, connected nodes, each node pointing to the next. Each node is divided into two parts. One part is a translation descriptor including the effective address to physical address mappings, and other translation details, such as protection bits, etc. The other part holds a pointer to the next node. Each time the embodiment 300 accesses the hash tables while searching or creating entries, it calculates an index using the formula (1) above. When the embodiment 300 creates an entry for the received EA it appends the translation descriptor including an effective address to physical address mapping corresponding to the received EA, to the end of the singly linked list 404 for the index. While searching the hash table 400, the embodiment 300 searches through every entry of the singly linked list 404 under the index, comparing a part, or whole, of the received EA, with a part of the translation descriptor.

Figure 5:
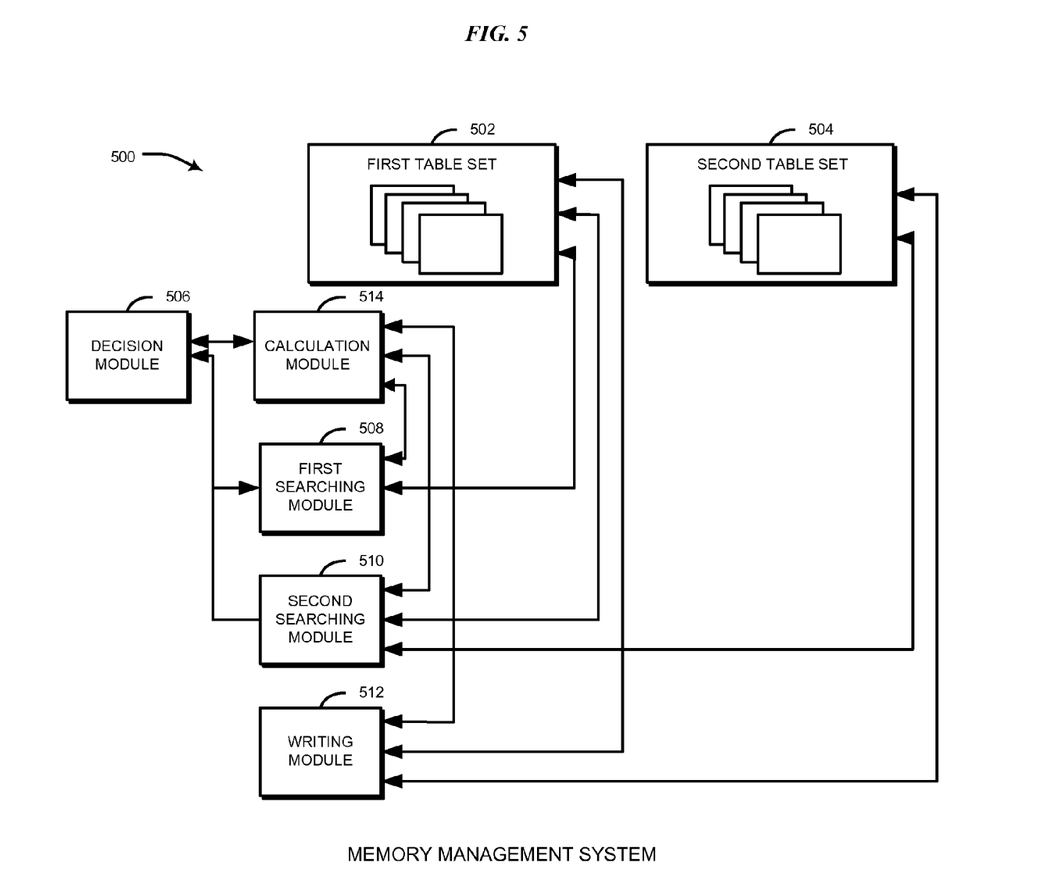
FIG. 5 illustrates a further embodiment of a memory management system, as set out in the claimed invention.

The embodiment 300 may be implemented using a memory management system 500, depicted in FIG. 5. The memory management system 500 includes two sets of tables, a first table set 502 and a second table set 504, used for memory management. In one embodiment, tables in the first table set 502 and the second table set 504 are hash tables. The first table set 502 may contain A type hash tables and the second table set 504 may contain O type hash tables as described in the embodiment 300. The first table set 502 has one member corresponding to each configured page size, and each member includes effective address to physical address mappings, and other translation details such as protection bits, etc., for pages of the corresponding size. The second table set 504 has one member corresponding to each configured page size, except for the smallest configured page size, and each member includes effective address to physical address mappings, and other translation details such as protection bits, etc., for pages of all sizes, except the corresponding size. This architecture facilitates searching in only one hash table of the second table set 504, as opposed to searching in multiple hash tables in the first table set 502.

In a further embodiment, a decision module 506 receives an effective address (EA) and a page size. Based on the received page size (RPS), the decision module 506 selects between a first searching module 508 and a second searching module 510. If the RPS is the smallest configured size, the decision module 506 selects the first searching module 508, and if the RPS is not the smallest configured size, the decision module 506 selects the second searching module 510.

In case the decision module 506 selects the first searching module 508, the first searching module 508 searches through the hash table corresponding to the RPS in the first table set 502. If the translation descriptor corresponding to the received EA is found, the first searching module declares 'success' and returns the physical address contained in the translation descriptor. On the other hand, if the translation descriptor corresponding to the received EA is not found in the hash table corresponding to the RPS, the memory management system 500 needs to create a new mapping in the hash table corresponding to the RPS in the first table set 502.

Before creating a mapping, however, the memory management system 500 ensures that the new mapping will not conflict with any existing mapping for another page size. To do this, the first searching module 508 proceeds to search in all hash tables in the first table set 502. If the translation descriptor corresponding to the received EA is found in any of these hash tables, the first searching module 508 declares a 'mismatch'. Alternatively, if the translation descriptor corresponding to the received EA is not found in any of these hash tables, the first searching module transfers control to a writing module 512. The writing module 512 creates new entries in the first and/or second table sets 502 and 504 if no prior effective address to physical address mapping is found for the received EA, in any of the hash tables searched. In case the first searching module 508 is selected, the writing module 512 creates an entry in the hash table corresponding to the RPS in the first table set, and additionally makes entries in all the hash tables in the second table set.

In case the decision module 506 selects the second searching module 510, the second searching module 510 searches through a hash table in the first table set 502. If the translation descriptor corresponding to the received EA is found, the first searching module declares 'success' and returns the physical address contained in the translation descriptor. On the other hand, if the translation descriptor corresponding to the received EA is not found in the hash table, the memory management system 500 needs to create a new mapping in the hash table corresponding to the RPS in the first table set 502.

Before creating this mapping, the memory management system 500 first ensures that this new mapping will not conflict with any existing mapping for another page size. To do this, the first searching module 508 searches in a hash table corresponding to the RPS, in the second table set 504. If the translation descriptor corresponding to the received EA is found in the hash table, the first searching module 508 declares a 'mismatch'. Alternatively, if the translation descriptor corresponding to the received EA is not found in the hash table, the first searching module 508 transfers control to the writing module 512. The writing module 512 creates new entries in the first and/or second hash table sets if no prior effective address mapping is found for the received effective address, in any of the hash tables searched. In case the second searching module 510 is selected, the writing module 512 creates an entry in the hash table corresponding to the RPS in the first table set, and additionally makes entries in the hash tables in the second table set corresponding to all page sizes except the RPS.

A calculation module 514 calculates an index used to index into hash tables, using Formula (1). The decision module 506, the first searching module 508, the second searching module 510 and the writing module 512 utilize the calculation module 514 during the execution of the embodiment 300. The first searching module 508, the second searching module 510, and the writing module 512 access hash tables, as described in connection with FIG. 4.

It should be noted that a number of memory architectures other than the memory architecture 200 shown in FIG. 2, are known in the art. Some of these alternate architectures may include only one level of address translation from a virtual address/effective address to a physical address, and in such situations the terms virtual address and effective address are used interchangeably. It should be understood that any of the embodiments of the invention disclosed here, may be part of a computer employing any type of memory architecture, and the definition of effective address would change accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a virtual memory system configured to allow multiple page sizes in a segment, the method comprising:
   receiving an effective address and a page size;
   providing a first table set, having one member corresponding to each configured page size, each member of the first table set containing translation descriptors, each translation descriptor having effective address to physical address mappings, made during address translations for pages of the corresponding size;
   providing a second table set, having one member corresponding to each configured page size except for the smallest configured page size, each member of the second table set containing translation descriptors, each translation descriptor having effective address to physical address mappings, made during address translations for pages of all sizes except the corresponding size;
   determining whether the received page size corresponds to the smallest configured page size and upon a determination that the received page size corresponds to the smallest configured page size, performing:
      obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and
      determining that no mapping for the received effective address exists, in any member of the first table set corresponding to a page size except the received page size, else determining that a mismatch situation results;
   upon a determination that the received page size does not correspond to the smallest configured page size, performing:
      obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and
      determining that no mapping for the received effective address exists, in the member of the second table set corresponding to the received page size, else determining that a mismatch situation results; and
   creating mappings, in the member of the first table set corresponding to the received page size, and in the member tables of the second table set corresponding to all page sizes except the received page size, in the event mismatch is not reported.

2. The method of claim 1, wherein the configured page sizes include 4K, 64K and 16M.

3. The method of claim 1, wherein location of the mapping in a table is obtained by calculating an index, wherein the table is a member of one of the first table set and the second table set.

4. The method of claim 3, wherein the table is a hash table.

5. The method of claim 3, wherein the page size to which the table corresponds, and table size are used as parameters in calculating the index.

6. A memory management system comprising:
   a virtual memory space divided into pages, wherein the pages have different sizes, wherein the virtual memory space is addressed using an effective address;
   a first table set, having one member corresponding to each configured page size, each member of the first table set containing translation descriptors, each translation descriptor having effective address to physical address mappings, made during address translations for pages of the corresponding size;
   a second table set, having one member corresponding to each configured page size except for the smallest configured size, each member of the second table set containing translation descriptors, each translation descriptor having effective address to physical address mappings, made during address translations for pages of all sizes except the corresponding size;
   a decision module configured to perform:
      receiving a page size and an effective address; and
      choosing a first searching module, upon determining that the received page size corresponds to the smallest configured page size; else choosing a second searching module, upon determining that the received page size does not correspond to the smallest configured page size;
   wherein
      the first searching module is configured to perform:
         obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and
         determining that no mapping for the received effective address exists, in any member of the first table set corresponding to a page size except the received page size, else determining that a mismatch situation results; and
      the second searching module, configured to perform:
         obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and
         determining that no mapping for the received effective address exists, in the member of the second table set corresponding to the received page size, else determining that a mismatch situation results; and
   a writing module for creating mappings, in the member of the first table set corresponding to the received page size, and in the member tables of the second table set corresponding to all page sizes except the received page size, in the event mismatch is not reported.

7. The system of claim 6, wherein the configured page sizes include 4K, 64K and 16M.

8. The system of claim 6, wherein the location of the mapping in a table is obtained by calculating an index, wherein the table is a member of one of the first table set and the second table set.

9. The system of claim 8, wherein the table is a hash table.

10. The system of claim 8, wherein a calculation module is operatively coupled with a plurality of modules comprising the decision module, the first searching module, the second searching module and the writing module.

11. The system of claim 10, wherein the calculation module uses the received page size and hash table size as inputs for calculating the index.

12. A method for managing a segmented virtual memory space, using tables including effective address data, wherein the method is executed on a computer system configured to allow multiple page sizes in the same segment, wherein the method comprises:
   dividing the memory into pages of different sizes;
   creating and maintaining page tables for address translation, wherein the page tables contain effective addresses, real addresses and attributes of the pages;
   creating and maintaining segment table, wherein the segment table comprises information about effective address to intermediate address mapping;
   matching and creating translation descriptors in the tables;
   receiving an effective address and a page size;
   providing a first table set, having one member corresponding to each configured page size, each member of the first table set containing translation descriptors, each translation descriptor having effective address to physical address mappings, made during address translations for pages of the corresponding size;
   providing a second table set, having one member corresponding to each configured page size except for the smallest configured page size, each member of the second table set containing translation descriptors, each translation descriptor having effective address to physical address mappings, made during address translations for pages of all sizes except the corresponding size;
   determining whether the received page size corresponds to the smallest configured page size and
   upon a determination that the received page size corresponds to the smallest configured page size, performing:
      obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and
      determining that no mapping for the received effective address exists, in any member of the first table set corresponding to a page size except the received page size, else determining that a mismatch situation results;
   upon a determination that the received page size does not correspond to the smallest configured page size, performing:
      obtaining the physical address for the received effective address by matching the received effective address to the translation descriptors, in the member of the first table set corresponding to the received page size, in the event such translation descriptors exist in the first table set, and returning the physical address from the matching translation descriptor, else generating the physical address by calculating the mapping; and determining that no mapping for the received effective address exists, in the member of the second table set corresponding to the received page size, else determining that a mismatch situation results; and creating mappings, in the member of the first table set corresponding to the received page size, and in the member tables of the second table set corresponding to all page sizes except the received page size, in the event mismatch is not reported.

13. The method of claim 12, wherein the configured page sizes include 4K, 64K and 16M.

14. The method of claim 12, wherein location of the mapping in a table is obtained by calculating an index, wherein the table is a member of one of the first table set and the second table set.

15. The method of claim 14, wherein the table is a hash table.

16. The method of claim 14, wherein the page size to which the table corresponds, and table size are used as parameters in calculating the index.

* * * * *